Aug. 2, 1932.　　　M. E. CARTIER　　　1,869,663
THERMOSTATIC MIXING MEANS
Filed March 8, 1930　　3 Sheets-Sheet 1

INVENTOR
MARCEL E. CARTIER
by his attorneys
Howson and Howson

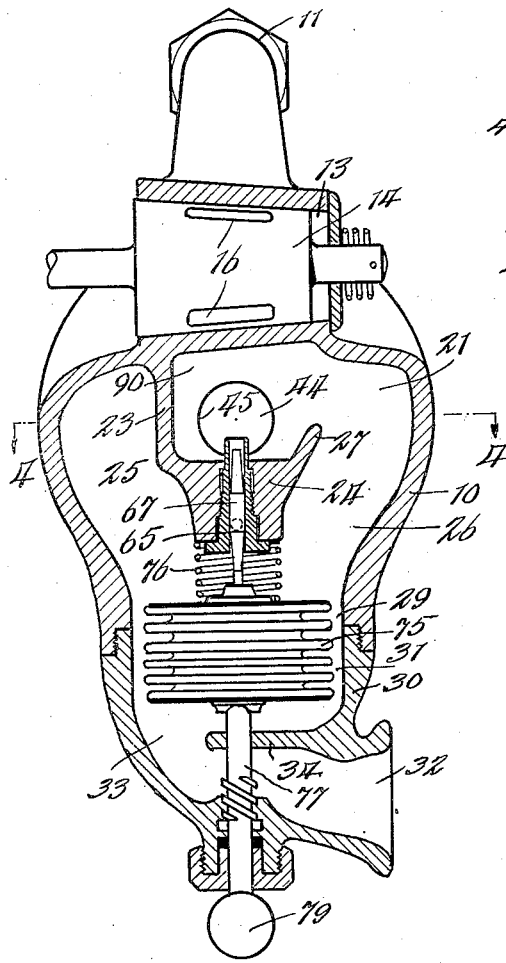
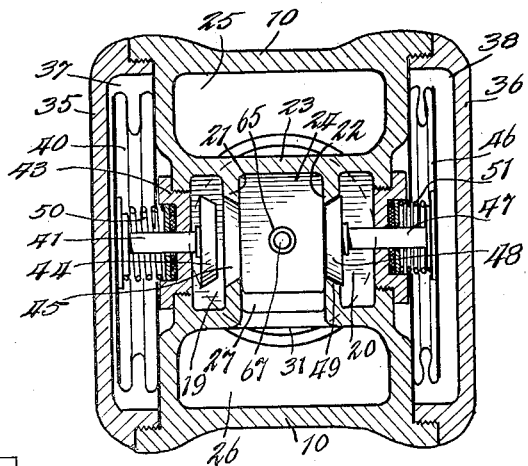
Fig. 4.
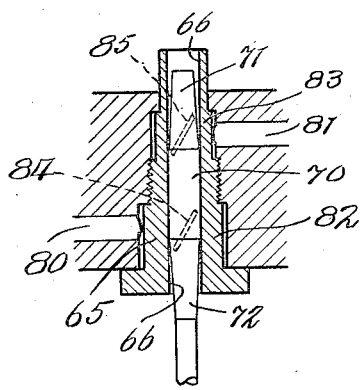
Fig. 3.
Fig. 2.

Aug. 2, 1932.  M. E. CARTIER  1,869,663
THERMOSTATIC MIXING MEANS
Filed March 8, 1930   3 Sheets-Sheet 3

INVENTOR
MARCEL E. CARTIER
by his attorneys
Howson and Howson

Patented Aug. 2, 1932

1,869,663

UNITED STATES PATENT OFFICE

MARCEL E. CARTIER, OF NEW ROCHELLE, NEW YORK

THERMOSTATIC MIXING MEANS

Application filed March 8, 1930. Serial No. 434,348.

This invention has to do with thermostatic mixing valves used to regulate the flow of streams of different temperatures in proper proportions to maintain a desired temperature of the delivery stream resulting from their mixture.

The aim of the invention is to obtain sensitive and reliable operation and smallness of size as the characteristics of a mixing valve. The large size, characteristic of all present known thermostatic mixing valves, limits the extent of their use, but a valve embodying this invention may be small enough to be used in a fixture for a lavatory or under similar conditions where the space is small but where the fixture must be concealed nevertheless.

The invention affords a control which responds to variations of pressure as well as to temperature changes in the supply so that the temperature of the resulting stream of mixed liquids may be kept practically constant at a selected one of a number of degrees within certain limits. The invention also provides a fixture for use with a wash basin or lavatory and embodying a thermostatic valve of such size that it may be concealed beneath the rim of the lavatory, presenting to view outside only a delivery spout, a controlling handle for setting the thermostatic element to give any one of a number of different temperatures of the mixed liquids, a controlling handle for the shut-off valve governing the flow to the mixing valve from the lines of supply and, if desired, a knob or handle for operating the waste valve.

According to this invention, the mixing valve has separate supply inlets for hot and cold water, both leading to a mixing chamber which may be specially shaped to aid the commingling or may be simply a part of the flow passage through the valve. There is preferably a valve controlling the flow to the mixing chamber from each inlet although it is possible to control the temperature of the commingled stream by regulating only one inflowing stream, usually the hot water stream, but as the control of one inlet stream does not give a constant delivery volume as do two oppositely acting valves, it is less desirable. By oppositely acting is meant that one valve opens as the other closes, and vice versa. To effect that action, the two valves may be on a single stem or otherwise mechanically connected, or they may be separate with separate actuating means controlled oppositely, or they may be independent of each other in part only, as for instance when each has a separate actuator subject to fluid pressure but is also acted upon by a spring common to both.

The valves are not operated directly by the thermostatic element but the latter operates a device which controls the difference between opposed forces acting on each valve operating means, or on the single valve operating means if the valves are mechanically interconnected. Thus, by varying the differential, a net effective force in either direction may be had. This sort of control permits the use of a small, sensitive thermostatic element since little power is needed to operate a device for controlling the pressures on the valve or valves as compared with the power, and incidentally necessary size, needed when the thermostatic element directly actuates the valves.

The opposed forces on each valve, or on the interconnected valves when that construction is used, may be obtained in different ways but I prefer to use a spring or the like, giving the valve, or valves, a bias toward one extreme position, in conjunction with opposed fluid pressures acting on opposite sides of a piston or diaphragm connected to the valve or to the interconnected valves. The fluid pressures are so related that when applied normally they balance or so approximate equality as to leave the spring in control. The fluid pressures opposing each other may be from the same source, and preferably are, or they may be from different sources. For instance, when a single actuator is used for both valves, the valves are mechanically connected and are so related to their seats that as one opens the other closes, and vice versa. With such valves it is convenient to communicate the pressure of the delivery stream to one side of the actuator (piston or diaphragm) and the pressure of one or both inlet streams to the other side, using also a spring of sufficient force to hold the valves in a mid-position with both partly open when both pressures are normally applied. When separate valves are provided, each inlet stream may be led to both sides of the actuator of the valve in its inlet passage so that opposed balanced pressures are imposed on each valve, leaving the spring, associated with each, effective to hold it in a desired position.

The thermostatic device controls the difference between the opposed forces on each valve when there are separately actuated valves, or on both valves when the valves are interconnected. When fluid pressure is used to actuate the valve or valves, the control is effected by governing the flow through a passage which, when open, permits relief of one of the opposed pressures so that the stable condition, obtaining when the pressures are normally applied, will be disturbed and a condition will be created under which the valve will move. When separately operated valves are used and both are held open or both closed when the pressures are normally applied, the thermostatic device is arranged to control oppositely two leakage passages, one from each valve, closing one passage while opening the other, and vice versa. When opposed pressures are used in conjunction with a spring having an opening tendency on the valve, the pressure relief is on the side acting with the spring so that, when the pressure is relieved, the unrelieved opposing pressure can overcome the spring and close the valve. Similarly if the spring has a closing tendency on the valve, the relief is on the side acting with the spring so that the unrelieved pressure can overcome the spring and open the valve.

The thermostatic element may be of any suitable type and need not be large or powerful. It may be placed in the hot water inlet to be subjected directly to the most commonly occurring fluctuations of temperature, or it may be subjected directly to the temperature of both inlet streams. Preferably however, the element is placed in the path of the delivery stream made up of the commingled hot and cold streams. There it is responsive to a change of temperature in either inlet stream since a change of temperature in either is reflected almost instantaneously in the temperature of the delivery stream.

It will be readily apparent that these and many other variations in arrangement and in details of construction are possible in the employment of the broader thoughts underlying the invention. I therefore give the following description of a particular valve as illustrative only of the invention and as the best embodiment of it now known to me.

In the drawings—

Fig. 2 is a central vertical section on a plane at right angles to that of the section shown in Fig. 1.

Fig. 3 is an enlarged view of a part of Fig. 1, this part being the pilot valve operated by the thermostatic element for controlling the operating means for the main valves.

Fig. 4 is a view in section on the line 4—4 of Figs. 1 and 2.

Figure 1:
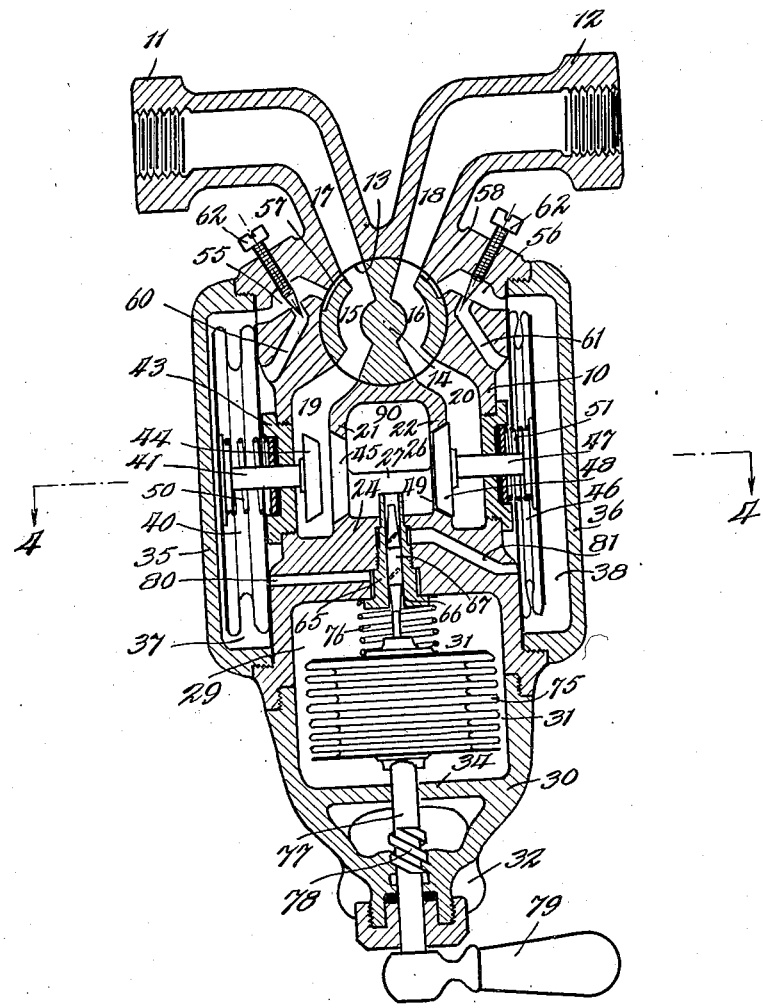
Fig. 1 is a central vertical section through the mixing valve.

The thermostatic mixing valve unit has a main part 10 which is a casting having integral projecting nipples 11 and 12 for connection to supply lines carrying water at different temperatures. For the present purpose it may be assumed that the inlet 11 is for hot water and the inlet 12 for cold water. At the point where these inlet lines meet the main body of the casting 10 there is a tapered bore 13 receiving a tapered plug valve 14 of any construction suitable for the purpose. This valve has two separate passages 15, 16 through it arranged to register, respectively, in one position with the two inlet ducts 17, 18 within the nipples and with passages leading to two separate chambers 19, 20 within the main casting 10. In another position reached when the plug is given a quarter turn from the open position just described, it closes off both inlet ducts 17, 18, thus preventing flow of either hot or cold water to the interior chambers 19, 20. At intermediate positions this valve 14 opens communication between the inlet ducts and the interior chambers to a greater or less extent but in each position opens both inlets proportionately. The inlet duct 17 is put in communication only with the interior chamber 19 and the inlet 18 only with the interior chamber 20.

Extending from one side wall somewhat more than half way across the interior of the casting 10 are two webs 21, 22 which at their inner ends are connected by a web 23 that extends at right angles thereto all the way across the interior. The lower ends of the parallel webs 21, 22 are connected by a narrow bridge 24 extending at right angles to them and forming in effect an enlarged offset lower end of the web 23. The space 25 in back of the bridge 24 and the web 23, (that is to say, the space to the left as viewed in Figure 2) is not a flow passage, but at the front side of the bridge there is a downwardly opening passageway 26 communicating with the space between the webs 21 and 22.

Along the front edge of the bridge 24 is a rim or lip 27 lying opposite the web 23 and defining with the latter the initial mixing chamber to which the hot and cold streams are introduced from the chambers 19 and 20 through valved openings (yet to be described) in the webs 21 and 22. If desired other forms of baffle than the simple lip 27 may be used to aid the commingling of the hot and cold streams.

The passageway 26 leads below the bridge 24 to a recess 29 in the lower face of the main casting 10. A hollow cover 30 is secured to the casting over this recess and with the latter provides a chamber 31 for the thermostatic element yet to be described. The cover 30 is a casting embodying a delivery spout 32 communicating with the chamber 31 for the thermostatic element by an opening 33 in a web 34 which extends across the casting. This web is so built as to force the mixed water to pass around and completely surround the thermostatic element before it leaves the chamber 31 and thereby to bring all parts of the thermostat to its temperature.

At opposite sides of the main casting 10 (see Fig. 1) are hollow cover plates 35, 36 which are threaded in the main casting. These provide chambers 37, 38 in which bellows of the sylphon type are mounted, one rim of each bellows being secured with a sealed joint to the side of the main casting 10 and the other or closed end being free. The bellows 40 in the chamber 37 has a valve stem 41 secured to the inner face of its free end. This valve stem extends through a plug 43 threaded in an opening in the side of the main casting 10 leading to the hot-water inlet chamber 19. The valve 44 carried at the inner end of this stem 41 coacts with a conical seat at the rim of an opening 45 in the web 21. Similarly, the bellows 46 in the other chamber 38 carries a valve stem 47 and a valve 48 which, when moved inwardly, seats on the rim of an opening 49 in the web 22 directly opposite from the opening 45 on the web 21. These bellows are also provided with springs 50, 51 arranged between their inner faces and the outer sides of the plugs through which the valve stems pass. The tendency of these springs is to expand the bellows and thus move the valves 44 and 48 away from their seats in the webs 21 and 22.

To subject the bellows respectively to the pressures of the hot and cold streams, the main casting is provided with passageways 55, 56 on opposite sides communicating respectively with the bellows chambers 37 and 38 on the outer sides of the bellows and communicating also with the inlet ducts 17 and 18 by means of arcuate recesses 57, 58 in the face of the valve plug 14 extending in opposite directions away from the passageways 15 and 16. Thus when the valve plug is in the open position shown in Figure 1, portions of the streams of hot and cold water are by-passed respectively through the arcuate recesses 57 and 58 to the bellows chambers 37 and 38 by way of the passageways 55 and 56. The arcuate recesses are of such extent that this by-pass communication is established in any position of the valve plug 14 which opens the inlet ducts 17 and 18 to any extent so that whenever there is flow to the interior chambers 19, 20, the pressures of the streams are communicated to the bellows.

To communicate the inlet pressures of the hot and cold water respectively to the interiors of the bellows, various expedients may be adopted such as openings through the bellows themselves or through the stems 41, 47 of the valves, but it is desirable, for some conditions at least, to provide passageways 60, 61 through the casting 10 itself connecting the by-pass channels 55, 56 respectively with the interiors of the bellows 40 and 46. Each of these passageways 60, 61 is provided with a needle valve 62 to regulate the flow through it and to constrict the passage so that upon fluctuation of pressure the change will be responded to first on the outer side of the bellows.

In the bridge 24 there is a vertical passageway threaded to receive a plug 65 which has a central bore 66 for a pilot valve 67 (see Figures 1 and 3). The pilot valve consists of a cylindrical mid-part 70 and two oppositely tapered end portions 71, 72 (as shown best in Fig. 3). The lower end of this pilot valve is connected to the upper end of a sylphon bellows 75 mounted in the bellows chamber 31 formed by the recess 29 in the main casting and the hollow cover 30, as described above. The bellows 75 is made of material having a relatively high co-efficient of expansion so that it is sensitive to changes of temperature and expands and contracts in response thereto. It is sealed and contains a highly volatile liquid which responds to temperature changes by changes in volume, and hence of pressure upon the bellows, thus tending to expand it or to allow it to contract as the case may be. There is a spring 76 between the lower face of the main casting and the upper face of the bellows 75 tending to move the bellows downwardly, a tendency which is opposed by a stem 77 which extends through the cover 30 and through the web 34 therein to rest against the lower face of the bellows 75. This stem has a spread 78 of relatively steep pitch co-acting with a threaded portion of the cover 30 and is provided with a fixed handle 79 by which it may be turned to cause it to advance or to retract. This movement of the stem 77 varies the pressure upon the bellows 75 as it varies the compression of the bellows itself and of the spring 76. This gives an adjustability of the normal position of the pilot valve 67.

There is a passage 80 extending lengthwise through the bridge 24 from the interior of the bellows 40 on the hot water side to the vertical opening in the bridge 24 into which the plug 65 is threaded. A passage 81 having a similar function extends from the interior of the bellows 46 on the cold water side to the same vertical passageway but leads into the latter at a level above the channel 80. The plug 65 has reduced portions 82, 83 opposite the ends of the channels 80 and 81 respectively, thus providing annular spaces around it to which these channels deliver. The plug is also provided with ports from these annular spaces to the interior bore 66. These ports 84, 85 are elongated and are inclined at an angle to the axis of the pilot valve 67. The cylindrical midportion 70 of the latter is of such length as to extend from one end of one of these ports to the corresponding end of the other, thus, in the position shown in Fig. 3, positioning the lower tapered portion 72 below the port 84 but putting the upper tapered portion 71 opposite the other port 85. As the pilot valve is moved it therefore varies oppositely the extent to which the ports 84 and 85 are opened, closing one as it opens the other, since when the cylindrical portion 70 is opposite either of these passages there can be no appreciable flow through it from the annular space to the interior bore 66.

It will be noted that the bore 66 in which the pilot valve is mounted opens at its upper end to the initial mixing chamber 90 which is bounded by the webs 21, 22 and 23 and is in communication with the thermostatic bellows chamber by way of the passageway 26 as shown in Figure 2. The lower end of the pilot valve bore 66 opens directly to the chamber 31 in which the thermostatic element 75 is mounted. The flow through either of the channels 80 and 81 from the interior of the valve operating bellows 40 and 46 is therefore conducted by the bore 66 eventually to the low pressure or outlet side of the valve.

Considering the device as a whole it will be seen that the function of the plug valve 14 is to control the flow of the hot and cold streams separately to the chambers 19 and 20 on opposite sides of the mixing chamber 90. This valve gives any desired degree of opening, varying proportionately the volumes of hot and cold water delivered to the valve. The function of the bellows operated valve 44 is to control the flow of the hot water from the chamber 19 to the mixing chamber 90 from which the liquid passes by way of the thermostatic chamber 31 to the outlet 32. The bellows operated valve 48 has a similar function with respect to the cold water, controlling as it does the flow from the chamber 20, which receives the cold water from the passageway 16 in the valve plug, to the mixing chamber 90. The hot and cold streams first meet in the chamber 90, and as the lip or rim 27 serves to baffle somewhat their direct flow out of the chamber, it causes a mixing of them as they flow to the passageway 26. Thus the streams are mingled by the time they reach the chamber in which the thermostatic bellows 75 is mounted and the temperature of the resultant stream is somewhere between that in the hot and that in the cold supply stream. It is this temperature to which the thermostatic element is subject. If when a mixed stream first passes it, it is not at the temperature desired for which the adjusting rod 77 is set, it will expand or contract as the case may be and thus shift the pilot valve 67 with the result of changing indirectly the position of the valves 44 and 48, as now to be described, until the proper proportions of hot and cold water are delivered to the mixing chamber.

The action of the valve operating bellows 40 and 46 is controlled by the pilot valve 67 operated by the thermostatic element 75. The bellows 40 is exposed on both sides to the pressure of the incoming hot water due to the by-pass connections 55 and 60 and therefore, if the pilot valve 67 is in such position that the leakage passageway 80 is closed, (as is the case in Figure 1) the bellows 40 and the valve 44 are held outwardly by the spring 50. In that condition the valve 44 is fully clear of its seat leaving the maximum opening for the hot water to flow from the chamber 19 through the opening 45 to the mixing chamber 90. The same is true of the bellows 46 operating the valve 48 which controls the flow of cold water to the mixing chamber 90 when the pilot valve is in a position closing entirely the leakage channel 81 from the interior of the bellows 46, since then the liquid pressures on this bellows are equal and the bellows is moved outwardly carrying the valve 48 away from its seat by the spring 51. Of course both of these conditions do not occur at once as both leakage passages 80 and 81 are never fully closed at the same time.

If it be assumed that the pilot valve is in a mid-position such that both leakage passages are open to an equal extent, there will be an equal flow from the interiors of the two valve actuating bellows and an equal reduction of pressure on that side of both bellows. Assuming also, for the moment, that the pressure of the hot and cold water supplies are equal, this condition of equal leakage will produce a condition of equal differential pressure on each valve operating bellows and therefore both bellows will be pressed inwardly against the effort of the springs 50, 51 to the same extent and both passages 45 and 49 leading respectively from the hot water and the cold water supplies to the mixing chamber 90 will be partially closed to an equal degree. If this condition gives a resulting temperature of the mixed liquids as desired, that is to say, equal to that for which the adjusting lever 77 is set to maintain the pilot valve in the mid-position assumed, then the stream will continue to flow and the temperature will remain the same.

If something occurs, however, to change the temperature of either the hot or the cold water supply, (and we may assume as an example that this occurrence is a lowering of the temperature of the hot water supply) the immediate effect is to lower the temperature of the mixed stream passing the thermostatic element 75. This lowered temperature causes a contraction of the bellows 75 which has the effect of moving the pilot valve downwardly so that it brings the mid-portion of the latter over the greater part of the inclined port 84 and over a shorter part, or possibly none at all, of the port 85 with the result that greater leakage can occur through the channel 81 from the bellows on the cold water side and a smaller amount of leakage can occur through the channel 80 leading from the bellows on the hot water side. The effect of this is to reduce the pressure on the interior of the cold water bellows and to increase the pressure on the interior of the hot water bellows until it equals or approximates that on the outside. The cold water bellows 46 therefore contracts and moves the valve 48 toward its seat while the hot water bellows 40 is moved outwardly by the spring 50, carrying the valve 44 farther from its seat. The result is an increase in the volume of hot water and a decrease in the volume of cold water supplied to the mixing chamber 90, without materially varying however the total volume of hot and cold water. This variation of the relative volumes tends at once to restore the temperature to the desired degree whereupon the pilot valve is moved back toward the mid-position. If, however, the abnormal condition is still obtaining, then before the pilot valve can return to its mid-position the lowering of temperature will have begun again and the pilot valve will be checked and will be held in, or will oscillate slightly on either side of, a position permitting a relatively greater amount of hot water to pass to the mixing chamber until the normal temperature of the hot water supply is restored. Some fluctuation of temperature in the mixture is involved but it is slight as the device responds to slight changes and compensates for variations in the mixture before they become appreciably great.

The valve unit just described is capable also of taking care of variations in the pressure of either the hot or cold water since, for instance, if the pressure of the hot water should drop, the volume passing through the valve would decrease and the temperature of the mixed liquid delivered at the outlet 32 would decrease as a result. The pilot valve would at once be shifted to open the valve 44 and to close the valve 48 until the relative volumes of the hot and cold streams passing to the mixing chamber were properly adjusted to give the desired resulting temperature. In addition to this effect, there is the direct effect upon the valve actuating bellows themselves, since a change of pressure in either supply is immediately reflected in the pressure conditions within the valve actuating bellows chamber on the corresponding side of the unit, enabling the spring to move the valve outwardly if the pressure is decreased, and causing the effort of the spring to be overcome and the valve to be moved inwardly if the change is an increase of pressure. Assuming for instance that the pressure of the hot water should decrease, the pressure on both sides of the bellows 40 would decrease, that on the outside decreasing more promptly due to the larger size of the passageway 55, and the spring 50 would then move the valve 44 outwardly permitting a larger volume of liquid to pass through the opening 45 to compensate for the tendency of the reduction of pressure to decrease the volume of flow.

Figure 5:
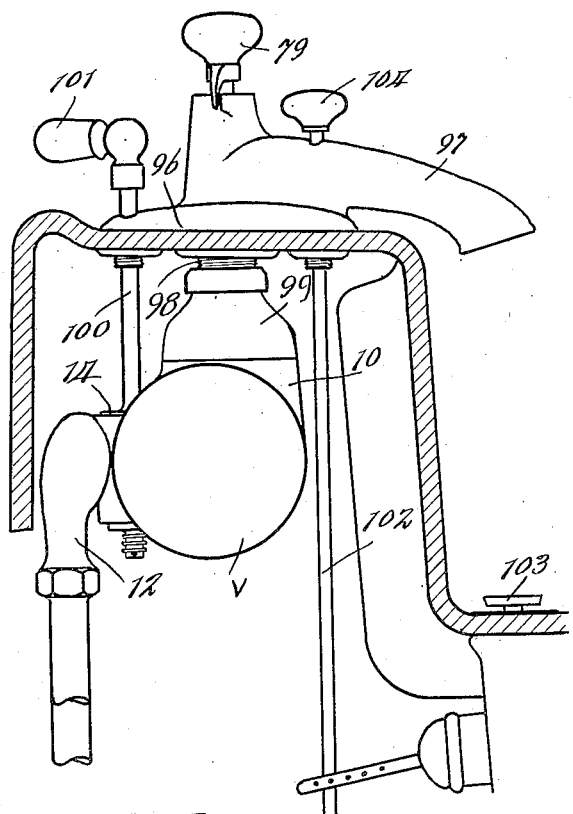
Fig. 5 is a view in elevation, with a part shown in section, of a unitary lavatory fixture embodying this invention.
Figure 6:
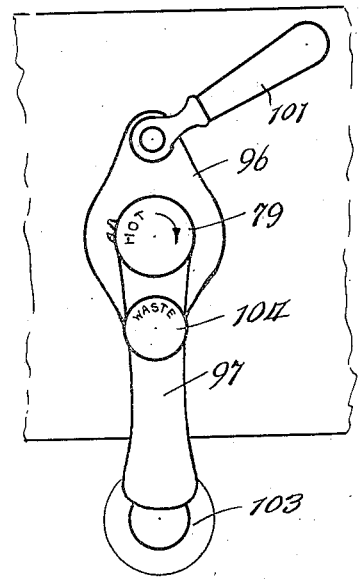
Fig. 6 is a top plan view of the part shown in Fig. 5.
Figure 7:
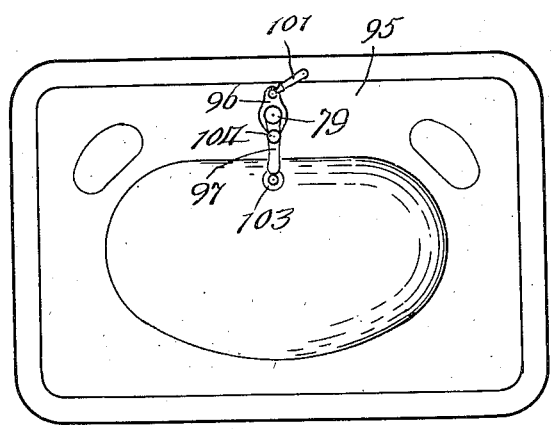
Fig. 7 is a plan view, drawn to a smaller scale than that of Figs. 5 and 6, showing a lavatory fixture to which the unitary fitting shown in Figs. 5 and 6 is applied.

In Figures 4, 5 and 6 is illustrated the application of a thermostatic mixing valve, embodying this invention, to a wash bowl. The thermostatic valve V itself is mounted on the under side of the back portion 95 of the bowl and is connected to an external fitting 96 which rests over an opening in the flat rim of the bowl. The valve is inverted from the position shown in the other figures so that the rod 77 for adjusting the thermostatic element extends upwardly through the external fitting 96 above which it carries the adjusting handle 79. The latter, or the part of the fitting near it, may be marked in any suitable way to indicate the direction or the extent of movement needed to give a higher or lower temperature.

The delivery spout 97 is an integral part of the fitting 96 and leads from the connecting pipe 98 to which the valve V is connected, this amounting to a separation of the cover 30 of the valve shown in the other figures into two parts, viz, the external fitting 96 and the cover 99 directly connected to the main casting 10 and to the connection piece 98. An operating stem 100 for the main shut-off valve 14 extends through the fitting 96 and has a handle 101 thereabove. In like manner, the rod 102 for operating, in a well known manner, the waste valve 103 in the bowl from underneath, extends through the fitting 96 and has a suitably marked knob 104 at its upper end. It will be noted that the plug valve 14 is arranged on a vertical axis in this case to facilitate its actuation by the vertical rod 100.

I claim—

1. A mixing valve comprising a mixing chamber, separate inlets leading thereto, a valve for controlling the flow from one of said inlets to said chamber, said valve having an actuator subject to opposed forces and responsive to variations of pressure in said inlet, said actuator being adapted to assume positions governed by the relative values of said forces, in combination with a thermostatic device responsive to the temperature of the fluid from the mixing chamber for controlling the difference between said opposed forces, for the purpose described.

2. In a lavatory fixture, a casing having a mixing chamber, separate inlets leading thereto, a valve for controlling the flow from one of said inlets to said chamber, a valve means externally operated for controlling the inlets, and another valve for controlling the flow from one of said inlets to said chamber, said valve having an actuator subject to opposed forces, in combination with a thermostatic device for controlling the difference between said opposed forces, and an external member for adjusting said thermostatic device.

3. A mixing valve comprising a mixing chamber, separate inlets leading thereto, a valve for each inlet for controlling the flow to said chamber, said valves being actuated under the influence of opposed forces and in response to variations in pressure in said inlet, and a thermostatic device responsive to the temperature of the fluid from the mixing chamber for controlling the difference between said opposed forces for the purpose described.

4. In a mixing valve comprising a mixing chamber, separate inlets leading thereto, a valve for controlling the flow from one of said inlets to said chamber, said valve being biased toward one of its extreme positions and having an actuator subject also to opposed fluid pressures, said actuator being responsive to variations in pressure in said inlet, in combination with a thermostatic device responsive to the temperature of the fluid from the mixing chamber for controlling the difference between said fluid pressures whereby either to maintain the differential at a value causing the valve to be positioned by the bias given it or to vary the differential to cause the valve to move against its bias.

5. In a mixing valve comprising a mixing chamber, separate inlets leading thereto, a valve for controlling flow from one of said inlets to said chamber, said valve having an actuator subject to opposed fluid pressures adapted to move toward one of its extreme positions when said pressures are normally applied, said actuator being responsive to variations in pressure in said inlet and a thermostatic device arranged for contact by fluid from said mixing chamber and responsive to the temperature thereof for controlling relief of one of said pressures whereby either to maintain them normally applied or to relieve one to produce a differential force moving said valve toward its other extreme position.

6. In a mixing valve comprising a mixing chamber, separate inlets leading thereto, a valve for controlling flow from one of said inlets to said chamber, said valve having an actuator subject to opposed pressures communicated from the inlet stream which the valve controls and being adapted to move toward one of its extreme positions when said pressures are normally applied, and a thermostatic device for controlling relief of one of said pressures whereby either to maintain them normally applied or to relieve one to produce a differential force moving said valve toward its other extreme position.

7. In a mixing valve comprising a mixing chamber, separate inlets leading thereto, a valve for controlling the flow from one of said inlets to said chamber, said valves having an actuator biased toward one extreme position and subject to opposed fluid pressures from said inlet, and a thermostatic device for controlling the fluid pressure acting with the bias.

8. In a mixing valve comprising a mixing chamber, separate inlets leading thereto, a valve controlling the flow from one of said inlets to said chamber, said valve having an actuator subject to opposed forces including a fluid pressure from said inlet acting to move it toward one extreme position, in combination with a valve controlling the relief of said fluid pressure to permit the valve to be moved toward its other extreme position and a thermostatic means arranged for contact by fluid from said mixing chamber and responsive to the temperature thereof for actuating said relief valve, for the purpose described.

9. In a mixing valve comprising a mixing chamber, separate inlets leading thereto, valve for controlling the flows from said inlets to said chamber, each of said valves being biased toward one of its extreme positions and subject to opposed fluid pressures, the source of the opposed pressures for one valve being one inlet stream and the source for the other being the other inlet stream, channels leading to the outlet side of the mixing chamber for relieving, on each valve, the pressure acting with this bias, in combination with valve means for controlling the flow through said channels, and a thermostatic means responsive to a temperature change in the fluid from the mixing chamber for operating the said valve means for the purpose described.

10. In a mixing valve comprising a mixing chamber, separate inlets leading thereto, valves for controlling the flows from said inlets to said chamber, each of said valves being biased toward open position and subject to opposed fluid pressures, the source of the opposed pressures for one valve being the inlet stream it controls and the source for the other being the other inlet stream, a channel leading to the outlet side of the mixing chamber for relieving the pressure of opening tendency on each valve, in combination with valve means for controlling oppositely the flow through said channels, and a thermostatic means subject to the temperature of the mixed streams for actuating the said valve means.

11. In a mixing valve comprising a mixing chamber, separate inlets leading thereto, valves for controlling the flows from said inlets to said chamber, each of said valves being biased toward the same extreme position and subject to opposed fluid pressures, the source of the opposed pressures for one valve being one inlet stream and the source for the other being the other inlet stream, channels leading to the outlet side of the mixing chamber for relieving the pressure acting in the direction of the bias on each valve, in combination with a valve for controlling oppositely the flow through said channels, and a thermostatic means subject to the temperature of the mixed streams for actuating the valve for said relief channels.

In testimony whereof I have signed my name to this specification.

MARCEL E. CARTIER.